Patented Feb. 23, 1926.

1,574,638

UNITED STATES PATENT OFFICE.

KATSUNAGA TAMANAHA, OF TOYOTAMA-GUN, TOKYO-FU, JAPAN.

PROCESS OF PRESERVING POWDER OF KONJAC TO BE USED FOR MANUFACTURING PASTE OR SIZING MATERIAL.

No Drawing. Application filed October 12, 1923. Serial No. 668,166.

*To all whom it may concern:*

Be it known that I, KATSUNAGA TAMANAHA, subject of the Emperor of Japan, residing at c/o Toru Takayama, No. 958, Azashimoshibuya, Shibuya-machi, Toyotama-gun, Tokyo-fu, Japan, have invented certain new and useful Improvements in a Process of Preserving Powder of Konjac to be Used for Manufacturing Paste or Sizing Material, of which the following is a specification.

This invention relates to a process of preserving powder of konjac to be used for the manufacture of paste or sizing material by treating konjac powder with an acid or acidulent substance or mixing the same therewith; and the object thereof is to remove the bad odor inherent in konjac powder to preserve the powder and to obtain an excellent sizing or cementing material.

Konjac powder, as is generally known, is powdered bulbs of *Amorphophallus konjac* belonging to the family of *Araceae*, and its chief component is mannan. When kneaded with water, the grains gradually swell and become a pasty substance, and when it meets alkali, it coagulates. It is different in its chemical and physical properties from starch. This konjac powder mixed with water forms an excellent sizing material used in textile industry, &c., but has an unpleasant odor; and when it is preserved, this odor becomes stronger and stronger. Moreover, it loses its adhesive property, until when kneaded with water the powder presents a sandlike appearance and does not form a paste. I have discovered that this is due to albuminous matters intermingled therein and the action of the basic compounds produced by the decomposition of the albuminous matters or basic substances coming from outside, and I have discovered that the above drawbacks can be obviated, by treating the powder with an acid or acidulent substance.

To carry out my invention into practice there will be many methods; for example, 100 parts of konjac powder may be intimately mixed with ten parts of powder of boric acid, or to 100 parts of konjac powder, five parts of salicylic acid may be mixed; or in a closed room konjac powder may be exposed for about one hour to sulphurous acid gas, hydrochloric acid gas or the like, introduced thereinto.

Moreover in this invention, instead of an acid, sodium bisulphate or any other acid salt may be utilized.

In this invention the acid or acidulent substance causes in the intermingled albuminous materials peptization which directly stops the decomposition of the materials, and even if more or less albuminous matters start to decompose and form ammonia or alkaline substances that come from outside, the remaining acid or acidulent substance neutralizes it, and the principal ingredients of konjac will remain unattacked. The konjac powder thus treated can be preserved.

The product of this invention may from time to time be kneaded by adding thereto a little water, and may be efficiently used for sizing material in textile industry or paper manufacture or as a cement for home use.

Claims:—

1. The process of preserving konjac powder, consisting in mixing therewith a substance having an acid reaction therewith.

2. The process of preserving konjac powder consisting in treating the same with a fluid having an acid reaction therewith.

3. The process of preserving konjac powder consisting in mixing therewith a free acid.

In testimony whereof I have affixed my signature.

KATSUNAGA TAMANAHA.